(12) United States Patent
Nagafuchi et al.

(10) Patent No.: US 7,127,374 B2
(45) Date of Patent: Oct. 24, 2006

(54) ELECTRIC POWER GENERATING FACILITY OPERATION REMOTE SUPPORTING METHOD AND ELECTRIC POWER GENERATING FACILITY OPERATION REMOTE SUPPORTING SYSTEM

(75) Inventors: Naoyuki Nagafuchi, Tokai (JP); Masao Furukawa, Jyuou (JP)

(73) Assignee: Hitachi, Ltd., Tokyo (JP)

( * ) Notice: Subject to any disclaimer, the term of this patent is extended or adjusted under 35 U.S.C. 154(b) by 255 days.

(21) Appl. No.: 10/238,631

(22) Filed: Sep. 11, 2002

(65) Prior Publication Data
US 2003/0105613 A1  Jun. 5, 2003

(30) Foreign Application Priority Data
Dec. 5, 2001  (JP)  ............................. 2001-370814

(51) Int. Cl.
G06F 11/00 (2006.01)
(52) U.S. Cl. ......................................... 702/183; 714/48
(58) Field of Classification Search ............ 702/57–62, 702/64, 65, 122, 182–185, 188; 700/286; 714/25, 37, 38, 48; 379/40; 705/8
See application file for complete search history.

(56) References Cited

U.S. PATENT DOCUMENTS

| | | | | |
|---|---|---|---|---|
| 4,635,468 A | * | 1/1987 | Hickam et al. ............. | 376/250 |
| 5,200,987 A | * | 4/1993 | Gray ........................... | 379/40 |
| 5,287,505 A | * | 2/1994 | Calvert et al. ................ | 707/10 |
| 5,463,768 A | * | 10/1995 | Cuddihy et al. .............. | 714/37 |
| 6,324,659 B1 | * | 11/2001 | Pierro ......................... | 714/48 |
| 6,473,659 B1 | * | 10/2002 | Shah et al. ................... | 700/79 |
| 6,532,425 B1 | * | 3/2003 | Boost et al. .................. | 702/63 |
| 6,557,115 B1 | * | 4/2003 | Gillenwater et al. ......... | 714/25 |
| 6,557,118 B1 | * | 4/2003 | Schleiss et al. ............... | 714/37 |
| 2001/0032109 A1 | * | 10/2001 | Gonyea et al. ................ | 705/8 |
| 2001/0056315 A1 | * | 12/2001 | Nagafuchi et al. .......... | 700/286 |
| 2001/0056335 A1 | * | 12/2001 | Ikeda et al. ................. | 702/188 |

FOREIGN PATENT DOCUMENTS

| | | |
|---|---|---|
| JP | 05-073793 | 3/1993 |
| JP | 06-251024 | 9/1994 |
| JP | 08-064653 | 3/1996 |
| JP | 11-053664 | 2/1999 |
| JP | 2000-003815 | 1/2000 |
| JP | 2000-020124 | 1/2000 |
| JP | 2000-056824 | 2/2000 |
| JP | 2000-099134 | 7/2000 |
| JP | 2001-249716 | 9/2001 |
| JP | 2001-297179 | 10/2001 |
| JP | 2001-325657 | 11/2001 |
| JP | 2002-6938 | 1/2002 |

* cited by examiner

Primary Examiner—Marc S. Hoff
Assistant Examiner—Mohamed Charioui
(74) Attorney, Agent, or Firm—Mattingly, Stanger, Malur & Brundidge, P.C.

(57) ABSTRACT

When an abnormality or a sign of abnormality occurs in an electric power generating facility, an appropriate operating support can be made in a short time.

The electric power facility operation remote supporting method in accordance with the present invention is characterized by that an abnormality or a sign of abnormality is judged based on at least one of information on an operating state of the electric power generating facility and information on time-varying characteristics of components in the electric power generating facility, and a service mode is set based on the judged information of the abnormality or the sign of abnormality, preset abnormality corrective data and preset service modes.

9 Claims, 7 Drawing Sheets

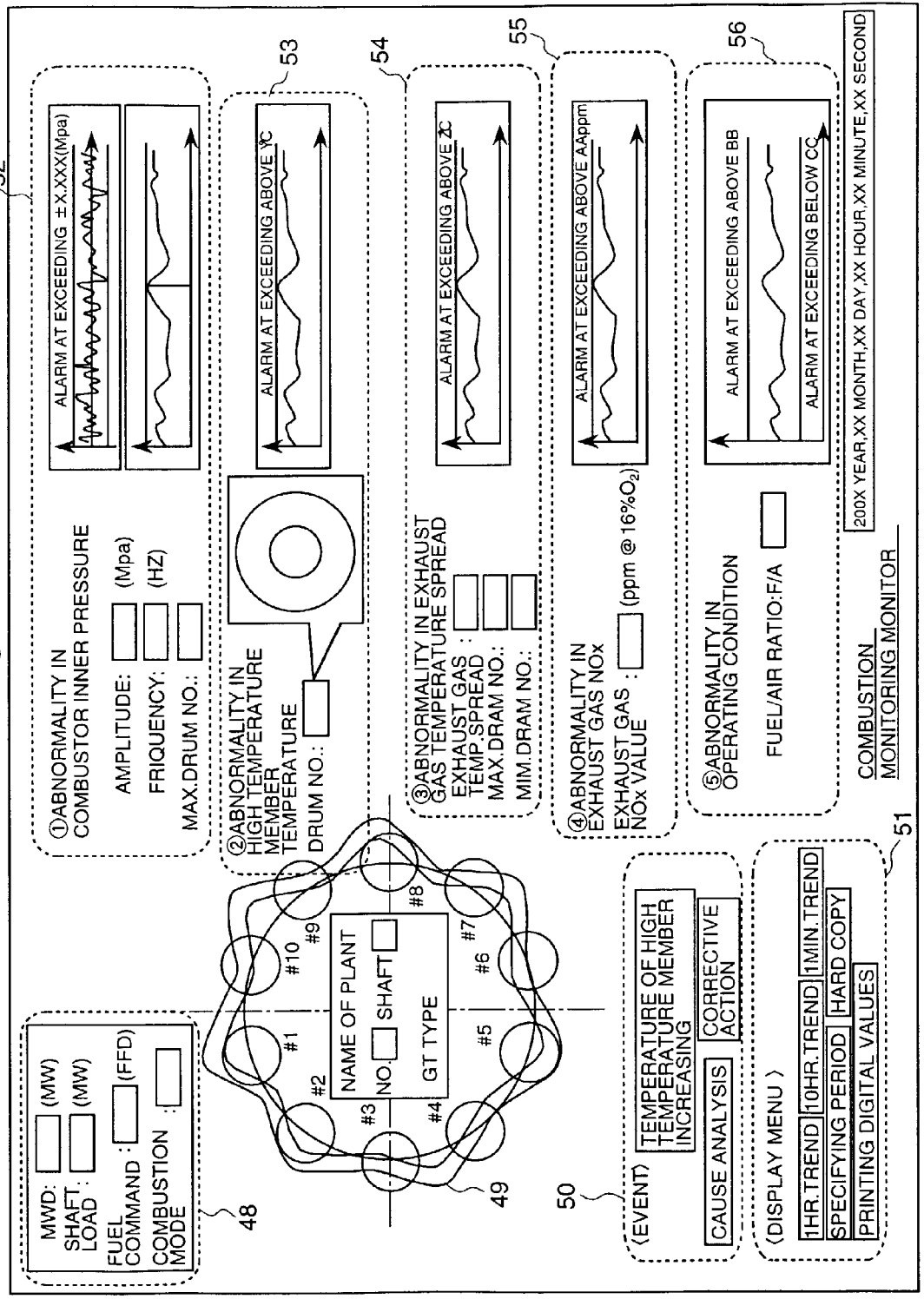

FIG. 5

| SENSOR INFORMATION | | | | | | |
|---|---|---|---|---|---|---|
| ITEM | UNIT | DAMAGE IN HIGH TEMP. GAS PASSAGE | FUEL NOZZLE | CLOGGING IN FUEL NOZZLE | ABNORMAL COMBUSTION |
| SHAFT POWER | MW | TREND MONITORING | — | — | TREND MONITORING |
| EXHAUST TEMP. INFORM. | °C | TREND MONITORING | TREND MONITORING | TREND MONITORING | TREND MONITORING |
| COMBUSTOR INNEP PRESS. | hPa | — | — | — | TREND MONITORING |
| COMPRESSOR DELIVERY PRESS. | MPa | TREND MONITORING | — | — | — |
| NOZZLE SOURCE PRESS. | MPa | — | TREND MONITORING | TREND MONITORING | — |
| HIGH TEMP. MEMBER METAL TEMP. | °C | TREND MONITORING | — | — | TREND MONITORING |
| AIR FLOW RATE | kg/s | TREND MONITORING | — | — | TREND MONITORING |
| FUEL FLOW RATE | kg/s | — | TREND MONITORING | TREND MONITORING | — |
| FUEL/AIR RATIO | — | TREND MONITORING | TREND MONITORING | TREND MONITORING | TREND MONITORING |
| URGENCY | TROUBLE LEVEL | SLIGHT TROUBLE 1 | SLIGHT TROUBLE 1 | SLIGHT TROUBLE 1 | SLIGHT TROUBLE 1 |
| MONITORING TIMING | MONITORING PERIOD | 1MIN. OR 1HR. | 1MIN. OR 1HR. | 1MIN. OR 1HR. | 1MIN. OR 1HR. |
| CORRECTIVE ACTION | | DECREASING LOAD | DECREASING FUEL | DECREASING FUEL | DECREASING FUEL/ARE RATIO |

FIG. 6

| SENSOR INFORMATION AND OTHERS | | | CONDITION | | |
|---|---|---|---|---|---|
| ITEM | SYMBOL | UNIT | 1 | 2 | 3 |
| DAVIATION IN FUEL/AIR RATIO(PLANNED VALUE -MEASURED VALUE) | F/A | — | LARGE DEVIATION ↗↙ | LARGE DEVIATION ↗↙ | LARGE DEVIATION ↗↙ |
| OPERATION FOR SLIGHT TROUBLE 1 | — | — | OFF | OFF | OFF |
| ABNORMARITY IN ACTUATOR | — | — | OFF | OFF | OFF |
| UNDER LOAD CHANGING | — | — | OFF | OFF | OFF |
| AIR FLOW RATE | Wa | kg/s | UNDER CHANGING ↗↙ | — | — |
| FUEL FLOW RATE | Gf | kg/h | — | UNDER CHANGING ↗↙ | — |
| FUEL COMMAND | FSR | % | — | — | UNDER CHANGING ↗↙ |

ELECTRIC POWER GENERATING FACILITY OPERATION REMOTE SUPPORTING METHOD AND ELECTRIC POWER GENERATING FACILITY OPERATION REMOTE SUPPORTING SYSTEM

BACKGROUND OF THE INVENTION

1. Field of the Invention

The present invention relates to an electric power facility operation remote supporting method and an electric power facility operation remote supporting system.

2. Prior Art

A method of supporting operation of a facility is disclosed, for example, in Japanese Patent Application Laid-Open No. 2001-249716. Further, there is disclosed Japanese Patent Application Laid-Open No.2002-6938 (published on Jan. 11, 2002) which is a prior patent application No. 2000-249716 relating to the present invention. These relate to the technology in which a level of abnormality in an electric power generating facility to be supported is judged, and then delivery of operation supporting information or a direct restoring corrective action is made based on the judged level.

However, both of the conventional technologies described above do not take any concrete items of monitoring information nor any diagnostic logic and control changing means necessary for applying the technology to an electric power facility into consideration.

In order to remotely monitor and diagnose an electric power generating facility, it is necessary to grasp a sign of phenomenon causing an abnormality. Further, it is also necessary to prevent unscheduled stopping of the facility operation which will be caused when the sign of the abnormal phenomenon is left as it is. In addition the above, when the unscheduled stopping of the facility operation is made, the outage time should be shortened by performing the diagnosis in a short time and producing the permanent corrective action plan in a short time.

In regard to a monitoring and diagnosing system and a method of operating the system which are suitable for performing services to support operation of a plurality of electric power supply facilities, a technology is required. The technology is effective particularly to an electric power supply system composed of a group of electric power generating facilities connected to an electric power system and a group of distributed electric source facilities such as an independent electric power generating facility, an IPP, a fuel cell and so on.

SUMMARY OF THE INVENTION

An object of the present invention is to provide an electric power facility operation remote supporting method and an electric power facility operation remote supporting system which can offer optimized operating support in a short time when an abnormality or a sign of abnormality occurs in the electric power generating facility.

An electric power facility operation remote supporting method in accordance with the present invention is characterized by an electric power facility operation remote supporting method for remotely supporting operation of an electric power generating facility, the method comprising the steps of presetting abnormality corrective-action data corresponding to a plural kinds of abnormality or abnormal sign data in regard to the electric power generating facility; presetting servicing modes corresponding to the abnormality corrective-action data; judging an abnormality or a sign of abnormality of the electric power generating facility based on at least one of operating state information of the electric power generating facility and information on time-varying characteristics of electric power facility components; and setting a servicing mode based on information judging an abnormality or a sign of abnormality and the preset abnormality corrective-action data corresponding to abnormality or abnormal sign data and the preset servicing modes corresponding to the abnormality corrective-action data when the abnormality or the sign of abnormality occurs in the electric power generating facility.

BRIEF DESCRIPTION OF DRAWINGS

FIG. 4 is a view showing an embodiment of a combustion monitoring image plane to which the present invention is applied.

FIG. 5 is a matrix showing the algorism of an embodiment of a slight trouble judging unit to which the present invention is applied.

FIG. 6 is a matrix showing an embodiment of an algorism of modifying control set values, diagnosing and automatic starting to which the present invention is applied.

DESCRIPTION OF THE PREFERRED EMBODIMENTS

An embodiment of an electric power facility operation remote supporting in accordance with the present invention comprises a means for transmitting information on operating states and time-varying characteristics of components from the electric power generating facilities installed at a plurality of distributed places or information directly transmitted from an operator of the supported electric power generating facility to the system; a means for processing and diagnosing the information obtained by the means for transmitting information; a means for stepwise weighting a degree of an abnormality when it is judged from the information obtained by the means for processing and diagnosing the information that the abnormality occurs in the facility; a means for automatically or according to construction of an operator of the present system diagnosing abnormality corrective-action information prepared for each of the weights (for example, locating occurrence of an abnormality or a sign of abnormality, estimating of a damaged portion and a status, verifying the adequacy of control set values, necessary parts at restoring and a stock status of the necessary parts, and so on); and a means for transmitting the obtained information to a section in charge of operation and to a section in charge of supporting operation of the electric power generating facility.

Further, the embodiment of an electric power facility operation remote supporting system in accordance with the present invention comprises a means for selecting a plurality of candidates of causes in descending order of probability among a knowledge group consisting of pre-accumulated failure causes in the electric power generating facility requiring corrective action and the contents of progressing or consequent phenomena when the present abnormal state is continued, and for offering information on the selected items; a plurality of anti-infiltration and interference-countermeasure means in a communication line between the electric power facility operation remote supporting system and the electric power generating facility requiring corrective action; and a means for enciphering all the signals in the communication line.

Embodiment

Figure 1:
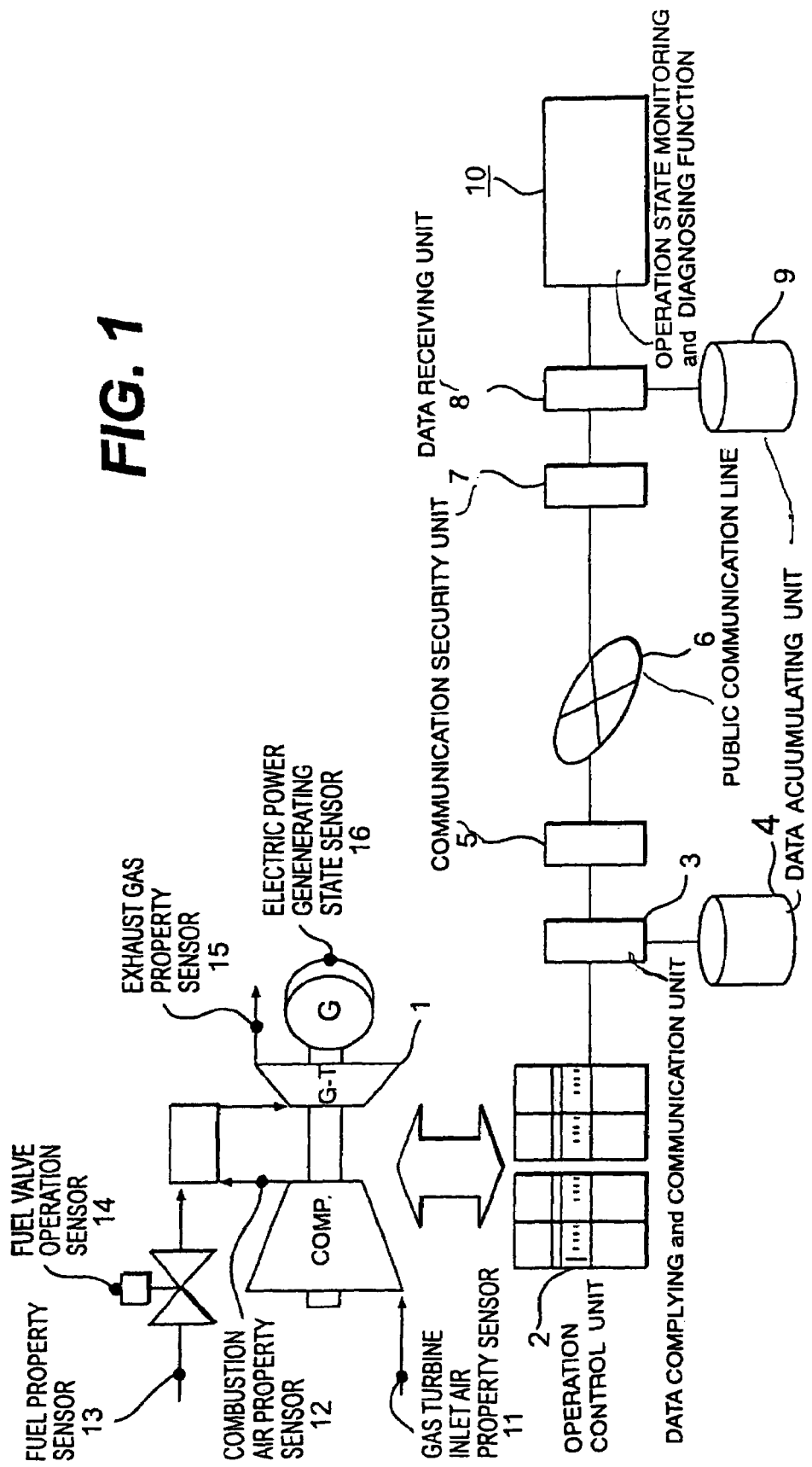
FIG. 1 is a block diagram showing the construction of an embodiment of an electric power facility operation remote supporting method in accordance with the present invention.

An embodiment of the present invention will be described below, referring an example of a gas turbine electric power generating facility. FIG. 1 is a block diagram showing the construction of an embodiment of a gas turbine electric power facility operation remote supporting system to which the present invention is applied.

A gas turbine electric power generating facility 1 comprises an operation control unit 2 for controlling operation of the gas turbine electric power generating facility; and measuring sensors (a gas turbine inlet air property sensor 11, a combustion air property sensor 12, a fuel property sensor 13, a fuel valve operation sensor 14, an exhaust gas property sensor 15 and an electric power generating state sensor 16) for measuring various kinds of process values in the gas turbine.

A data compiling and communication unit 3 for compiling data and sending data; a data accumulating unit 4 for storing and accumulating necessary data in a memory medium, the data accumulating unit 4 being contained in the data compiling and communication unit 3; and a communication security unit 5 are arranged in the electric power generating facility side from a public communication line 6 of a data communication means. Information of the operating control unit 2 and the measuring sensors is transmitted to the data compiling and communication unit 3, and then transmitted from the data compiling and communication unit 3 to a monitoring and diagnosing side via the communication security unit 5 through the public communication line 6.

A communication security unit 7; a data receiving unit 8 for receiving data; and a data accumulating unit 9 for storing and accumulating necessary data in a memory medium, the data accumulating unit 9 being contained in the data receiving unit 8 are arranged in the monitoring and diagnosing side (monitor side) from the public communication line 6 of the data communication means. The above-described information of the operating control unit 2 and the measuring sensors is transmitted to the monitoring and diagnosing side through the public communication line 6 is transmitted to the data receiving unit 8 through the communication security unit 7, and then input to an operating state monitoring and diagnosing function 10 from the data receiving unit 8.

Here, an example of the contents of the communication information will be described. The information of the operation control unit 2 means, for example, a control operating terminal signal, an electric power generation output demand signal, a protective operation signal and so on. The sensor information means a gas turbine inlet air property sensor 11, a combustion air property sensor 12, a fuel property sensor 13, a fuel valve operation sensor 14, an exhaust gas property sensor 15 and an electric power generating state sensor 16.

The communication information between the communication security unit 5 arranged in the outlet side of the public communication line 6 and the communication security unit 7 arranged in the inlet side of the public communication line 6 is enciphered. Further, the communication security unit 5 and the communication security unit 7 have an access right authorization function to the system communication line.

Figure 2:
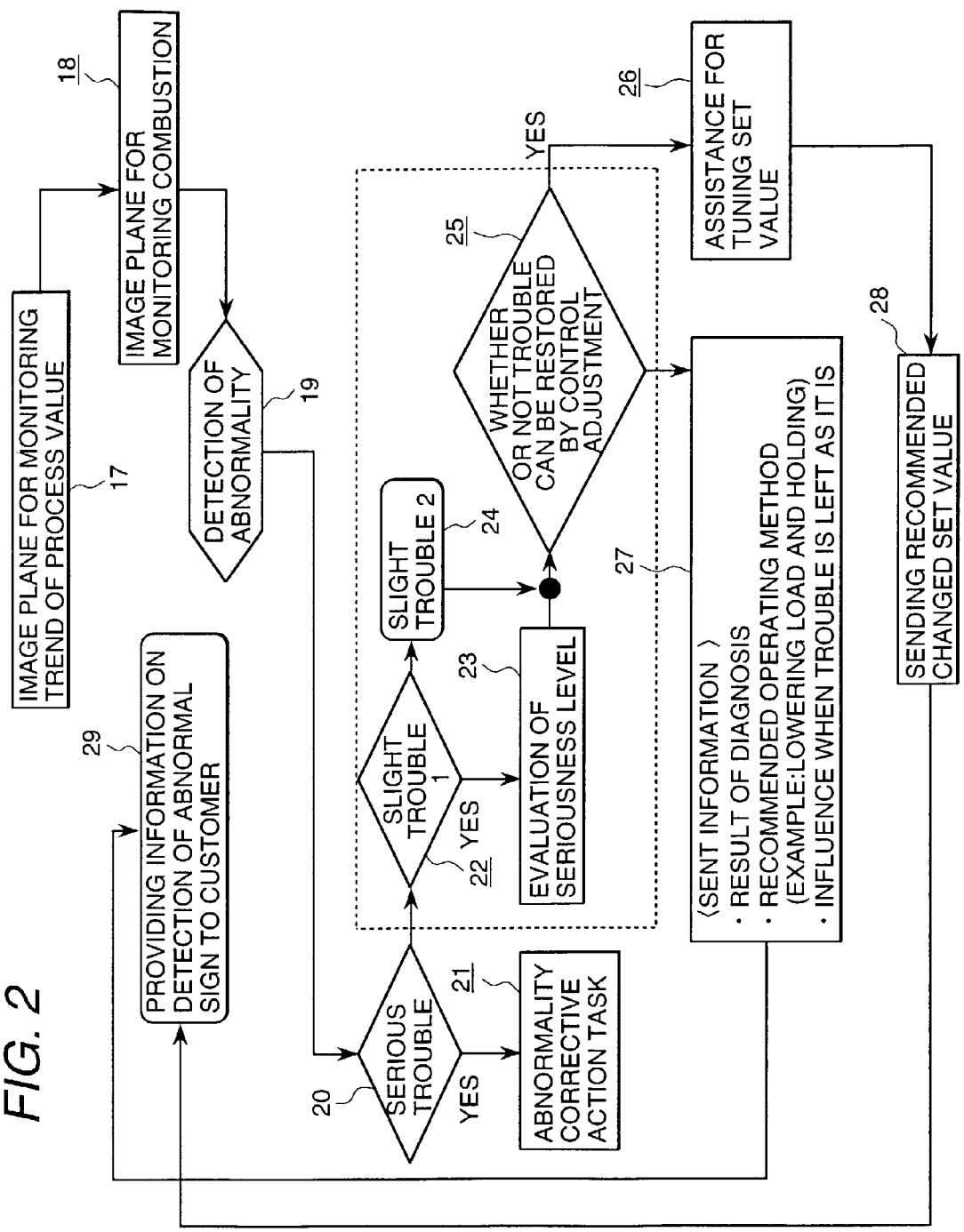
FIG. 2 is a chart showing the algorism of an embodiment of an abnormality monitoring/diagnosing function to which the present invention is applied.

The contents of the monitoring and diagnosing function 10 of the present system will be described below, referring to FIG. 2. FIG. 2 shows the algorism of an embodiment of an abnormality monitoring and diagnosing function to which the present invention is applied. As information from the data receiving unit 8 in FIG. 1 is transmitted to the monitoring and diagnosing function 10, the information is displayed on a process value trend monitoring image plane (page) 17 in the monitoring and diagnosing function 10, and accordingly the time-varying dynamic characteristics of the gas turbine electric power generating facility are monitored. The process value trend monitoring image plane 17 may be displayed as a part of a combustion monitoring image plane (page) 18 at the same time. The information displayed on the combustion monitoring image plane 18 and the information from the data receiving unit 8 are processed by signal processing in an abnormality detection function 19 to calculate a deviation from the normal operating state of the supported facility 1 or a dynamic trend of each proves value. When the deviation or the dynamic trend of each proves value exceeds a preset threshold value, it is judged that an abnormality or a sign of abnormality occurs, and then a level of the abnormality is judged by the following method.

When a serious trouble judging unit 20 judges based on the input value of the above-described process value trend monitoring image plane 17 that the operation of the electric power generating facility needs to be stopped immediately because a serious damage will occur in the hardware itself if the operating state of the electric power generating facility 1 is left as it is, the serious trouble judging unit 20 output a trigger signal to an abnormality corrective action task 21 using the output signal of the abnormality detection function 19 as a trigger. When the serious trouble judging unit 20 judges that no serious damage will occur, the judgment is shifted to a first slight trouble judging unit 22.

The first slight trouble judging unit 22 executes the following information processing. An seriousness level evaluation function 23 evaluates the possibility of occurrence of damage in the components depending on time lengths of leaving the abnormality using the information from the first slight trouble judging unit 22, and the evaluated information is transmitted to a restoring capability evaluation judging unit 25. Similarly, information judged to be "slight trouble level 2" in a second trouble judging unit 24 is transmitted to the restoring capability evaluation judging unit 25. The restoring capability evaluation judging unit 25 judges whether or not restoration of the state can be performed by tuning the control set value. If possible, the information of the restoring capability evaluation judging unit 25 is transmitted to a control set value tuning supporting function 26 to tune control operating variables. If impossible, the information of the restoring capability evaluation judging unit 25 is transmitted to a sending information arranging function 27.

On the other hand, information from the control set value tuning supporting function 26 is transmitted to a recommended updated set value sending function 28. The recommended updated set value sending function 28 and the sending information arranging function 27 transmit information on the result of diagnosis, a recommended operating method, an influence when the trouble is left as it is, and so on is transmitted to a client presentation function 29 to offer the information on the cause of occurrence of the abnormality, the operation supporting information etc to the operation managing person. As described above, abnormality corrective actions corresponding to a plurality of abnormalities or signs of abnormality are set. That is, these functions correspond to a database storing the abnormality corrective action data corresponding to the plurality of abnormalities or signs of abnormality in regard to the electric power generating facility.

Figure 3:
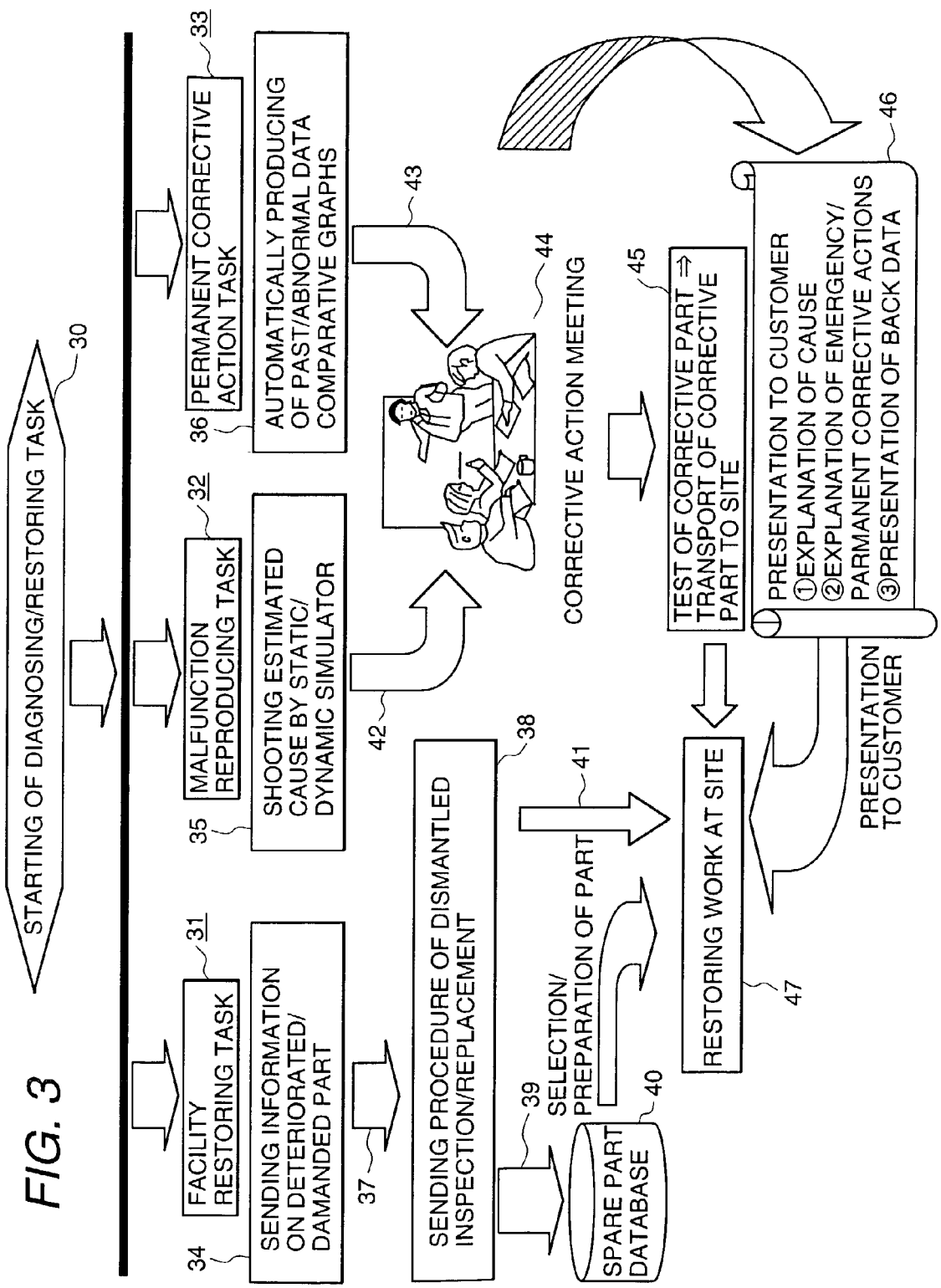
FIG. 3 is a chart showing the algorism of an embodiment of an abnormality corrective action task to which the present invention is applied.

The contents of the abnormality corrective action task 21 will be described below, referring to FIG. 3. FIG. 3 shows the algorism of an embodiment of an abnormality corrective action task to which the present invention is applied.

A diagnosing and restoring task 30 is started by a trigger signal from the serious trouble judging unit 20 in FIG. 2, and transmits a trigger signal and the above-described information from the data receiving unit 8 to a facility restoring task 31, a malfunction reproducing task 32 and a permanent corrective action task 33.

In the facility restoring task 31, information 37 on an estimated deteriorated/damaged state and a scheduled inspection of a specified portion, which are obtained based on the obtained information and information on pre-performed analysis of high temperature members easily deteriorated or damaged and information on scheduled inspection, is sent from an information sending function 34 to a dismantled inspection and replacement procedure sending function 38. Information on inspection methods and replacing procedures for plural portions is set in advance in the dismantled inspection and replacement procedure sending function 38, and after selecting information 39 on members necessary for the replacement, information on part selection/number of stored parts is sent to a site restoring worker 47 through a spare part database 40. At the same time, the information 41 on the inspection method and the replacing procedure is also sent to the site restoring worker 47.

In the malfunction reproducing task 32, information 42 on an abnormality or a sign of abnormality occurring at a position other than the position of each of the process value measuring sensors 11 to 16 shown in FIG. 1 is produced based on the obtained information using an estimated cause shooting function 35 including a static characteristic and dynamic characteristic evaluation simulator which is pre-tuned so that the characteristics of the supported facility can be simulated, and then the produced information 42 is presented, for example, to a corrective action meeting 44.

In the permanent corrective action task 33, information 43 necessary for the corrective action meeting, for example, a comparative graph of normal process data and abnormal process data, a graph of mass ratio of fuel to air and so on, is produced using a past/abnormal data comparative graph automatic producing function 36 for comparing past and abnormal case data in the supported facility 1 and other gas turbine facilities of the same type as the supported facility 1, and then the produced information 43 is presented to the corrective action meeting 44.

A course of the action or knowledge obtained by the corrective action meeting 44 is offered to a section 45 in charge of corrective part testing, and the parts are shipped to the supported facility 1 if the course of the action or the knowledge is very effective. At the same time, information 46 for presenting the client of the site, for example, explanation of the cause, explanation of recommended emergency/permanent corrective actions and back data used for the judgment are sent to the site restoring worker 47.

As described above, a service mode can be set depending on the kinds of tasks. In other words, these functions correspond to the databases storing service modes corresponding to the abnormality corrective action data.

A basic specification of the combustion monitoring image plane (page) 18 will be described below, referring to FIG. 4. FIG. 4 shows an embodiment of a combustion monitoring image plane to which the present invention is applied. Here, description will be made on an example case where the present invention is applied to a combustor of low nitrogen oxide generation using a combustor of pre-mixing combustion type.

On the combustion monitoring image plane 18, at least the following monitoring information and starting triggers such as diagnosing functions are displayed.

In a plant operating state display 48, information on an electric power generating command value, an electric power generating output of the gas turbine electric power generating facility 1, a fuel command value and a combustion state is displayed. Here, a MWD value (MW), a shaft load value (MW), a fuel command value (FFD) and combustion mode can be displayed.

In an exhaust gas temperature and combustor inner pressure distribution display 49, a supported electric power generating facility nam3e (a plant name), gas turbine numbers when a plurality of gas turbines are installed and a type of the facility can be displayed. Further, a pressure distribution among a plurality of concentrically arranged combustors (for example, #1 to #10) and a temperature distribution among the plurality of exhaust gas property sensors 15 arranged in the exhaust portion in FIG. 1 can be displayed. The information of the temperature distribution is displayed corresponding to a whirling angle of the combustion gas corresponding to the load of the gas turbine electric power generating facility 1.

In an event information display portion 50, an item of occurrence of an abnormality or a sign of abnormality can be displayed. In this embodiment, the indication "temperature of a high temperature member is increasing" is displayed. Further, the trigger buttons (a cause analysis button and a corrective action button) for the first slight trouble judging unit 22 and the abnormality corrective action task 21 of diagnosing and restoring task used in a case of occurrence of an abnormality are displayed. The trigger signals can be transmitted to the first slight trouble judging unit 22 and the abnormality corrective action task 21 by providing the trigger buttons.

In a display menu 51, time axis setting buttons of trend pages expressed in the right hand side column of the combustion monitoring page and printing buttons are displayed. The trend pages mean a combustor inner pressure information display 52, a high temperature member temperature display 53, an exhaust gas temperature display 53, an exhaust gas temperature display 54, an exhaust gas property display 55 and an operating state display 56. Here, a plurality of buttons, such as a 1 hour trend, a 10 minute trend, a 1 minute trend and a specifying time buttons are prepared as the time axis setting buttons. Further, a plurality of buttons such as a hard copy and a digital value printing buttons are prepared as the printing buttons.

In the combustor inner pressure information display 52, an amplitude (MPa), a frequency (Hz) and a maximum fluctuation combustor position Max Dram No. are displayed as the pressure fluctuation characteristics, and a graph of a level outputting an alarm and time sequence data of the combustor inner pressure is also displayed.

In the high temperature member temperature display 53, a temperature of a member in the combustor having a maximum temperature is displayed. A drum number is displayed, and a graph of an upper limit level outputting an alarm and data of temperature change of the member is also displayed.

In the exhaust gas temperature display 54, the maximum and the minimum exhaust gas temperatures and information on an exhaust gas temperature spread value expressing a difference between the maximum value and the minimum value obtained from information from the sensors 15 distributed in the exhaust portion of the gas turbine electric power generating facility 1 are displayed. Further, a maximum drum number and a minimum drum number are also displayed, and a graph of an upper limit level outputting an alarm and data of exhaust gas temperature spread change is displayed.

In an exhaust gas property display 55, information on production of nitrogen oxide in the exhaust gas obtained from the information of the exhaust gas property sensor 15 is displayed. Here, an exhaust gas NOx value is displayed, and a graph of a level outputting an alarm and time sequence data of the exhaust gas NOx value is displayed.

In a combustor operating state display 56, information on a fuel-air ratio (defined by a mass ratio of fuel to air, F/A) dominating a combustion state is displayed. Further, a graph of an upper limit level outputting an alarm and a lower limit level outputting an alarm and time sequence data of the fuel-air ratio is displayed.

The algorithm of the first slight trouble judging unit 33 will be described below, referring to FIG. 5. FIG. 5 shows the algorism of an embodiment of a slight trouble judging unit to which the present invention is applied. The trends of information on the control unit 2 and each of the measuring sensors in regard to the high temperature gas passage portion, the fuel nozzle and the combustion status are evaluated based on the information from the data receiving unit 8 according to the an arbitrary preset value of monitoring time period. For example, in regard to the high temperature gas passage portion, changing trends of a shaft power output, an exhaust gas temperature, a compressor delivery pressure, an air flow rate, a high temperature portion metal temperature, a fuel-air ratio and so on of the objective gas turbine electric power generating facility 1 are monitored. For each of the monitored items, operation supporting information is output. An example of the operation supporting information is that in a case where one of the item is diagnosed as abnormal by a pre-constructed AND/OR logic, it is judged that a "slight trouble 1" occurs, and the operation supporting information, for example, "decrease operating load" is output. In other words, operation supporting information of an abnormality corrective action can be output corresponding to the trend of each kind of the data. Therein, the algorithm is pre-formed into a database, and stored in the system.

The algorithm of the restoring capability evaluating and judging unit 25 of the control set value modifying and diagnosing and automatic starting function will be described below, referring to FIG. 6. FIG. 6 shows an embodiment of the algorism of modifying control set values, diagnosing and automatic starting to which the present invention is applied. Condition judging references 1, 2, 3 are judged by a pre-constructed AND/OR logic that a deviation in an actually measured value from a planed value of fuel-air ratio is large, and the abnormality is not a "slight trouble 1" and not an actuator abnormality, and the abnormality did not occur during load changing. In the above case, a trigger signal is output when changes of the compressor air flow rate, the fuel flow rate and the fuel command value depart from the ranges of the allowable values.

Figure 7:
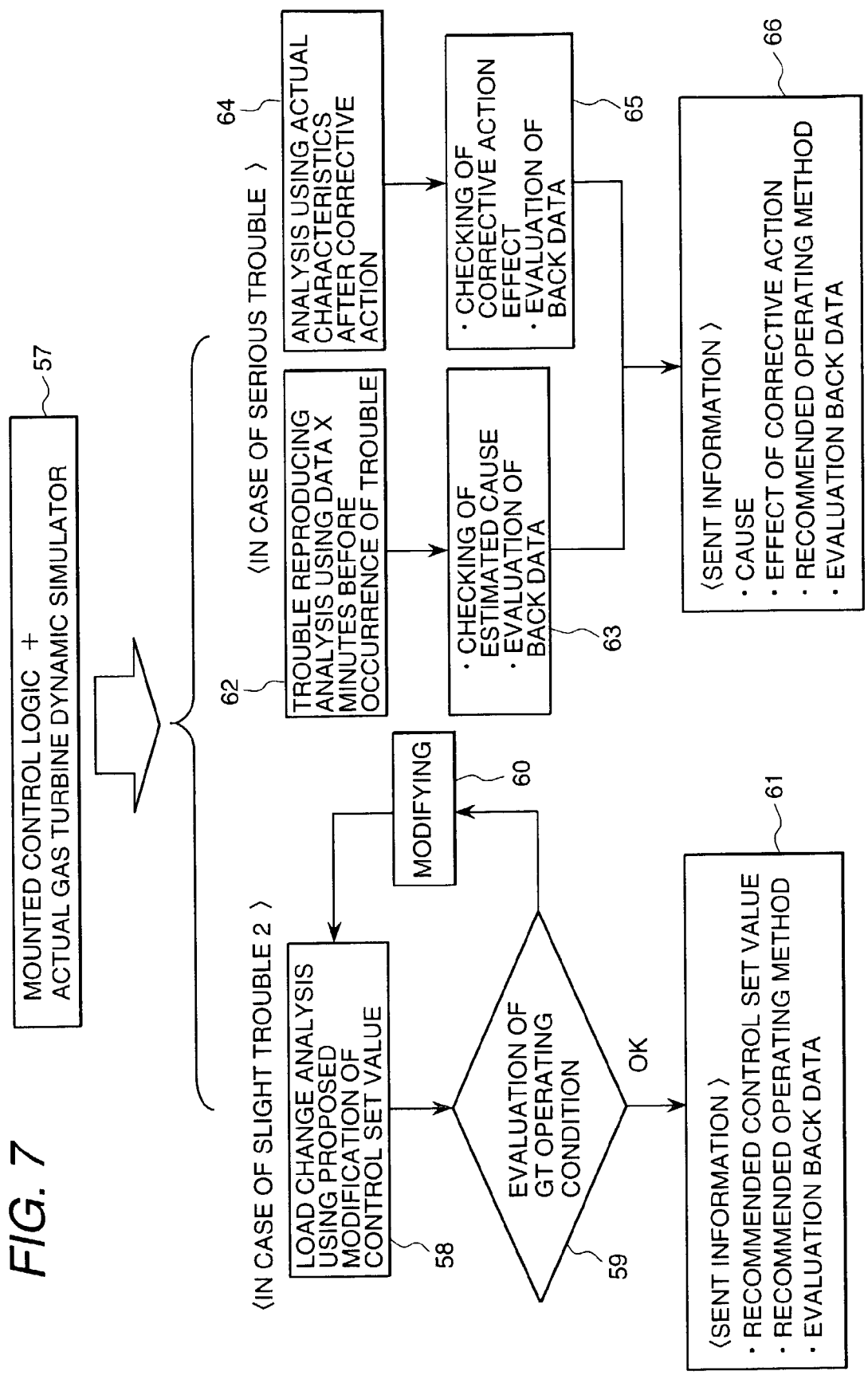
FIG. 7 is a diagram showing the algorism of an embodiment of a control set value tuning supporting function and a restoring supporting function to which the present invention is applied.

The algorithms of the control set value tuning supporting function 26 and the malfunction reproducing task 32 of the restoring supporting function will be described below, referring to FIG. 7. FIG. 7 shows the algorism of an embodiment of a control set value tuning supporting function and a restoring supporting function to which the present invention is applied. The control set value tuning supporting function 26 and the malfunction reproducing task 32 of the restoring supporting function are executed as described below using an operating characteristic evaluation tool 57 which is combination of a gas turbine dynamic simulator and a mounted control logic which are pre-tuned using the test operation and operating actual data so as to simulate the actual characteristics.

As shown in FIG. 7, in the case of the slight trouble 2, a load changing operation analyzing function 58 including the above-described operating characteristic evaluation tool 57 is operated using tuning indexes obtained from pre-performed sensitivity analyses and past cases, and using information from a modifying function 60 including a means for selecting and automatically tuning tuned items by the actually measured data. Then, it is checked using a judging unit 59 whether or not the obtained result falls within an allowable range of a planned value.

If the output of the judging unit 59 is NO, the tuning processing is repeated through the modifying function 60. If the output of the judging unit 59 is YES, sent information 61 composed of recommended control set values, a recommended operating method and evaluation back data are output to the above-described sending function 28.

In the case of a serious trouble, in the above-described malfunction reproducing task 32, a trouble reproduction analysis is executed by the above-described operating characteristic evaluation tool 57 using data X hours before occurrence of the trouble 62 automatically or manually transmitted from the data compiling and communication unit 3, and then an estimated cause and back data used for the judgment 63 are output to a sent information 66. There, the X hours of the data 62 may be arbitrarily set.

On the other hand, in order to reflect the studied result of the above-described corrective action meeting, an effect of the corrective action and back data used for the evaluation are output to the sent information 66 by a function 64 for executing analysis by the above-described operating characteristic evaluation tool 57 using operation actual values of the objective facility 1 in the above-described data accumulating unit 9. The sent information 66 is composed of the cause, the effect of the corrective action, the recommended operating method and the evaluation back data etc, and is offered to the site restoring worker 47 and the manager of the electric power generating facility.

The contract form with the facility manager will be described below. The contract amount is determined corresponding to the degree of technical difficulty of the service contents according to the following procedure.

Therein, the degree of technical difficulty here does not mean particularly complex processing or analysis calculation, but means an application range of know-how and technical power accumulated for a long term by the manufacturer.

In a case of a contract in which the client judges whether the operation of the facility is continued or the inspection of the facility is to be performed in the next shut-down period, the service mode is that only the information on the sign of abnormality detected in the abnormality detecting function 19 is sent to the operation managing person.

In a case of a contract in which the restoration and diagnosis information is provided to the client when an unscheduled stoppage of the concerned facility occurs, the service mode is that the information output from the trouble judging functions 20 to 24 in FIG. 2 and the malfunction reproducing task 32 in FIG. 3 is sent to the operation managing person.

In a case of a contract in which the supporting of tuning the control set values is included, the service mode is that the information output from the set value tuning function 26 in FIG. 2 is sent to the operation managing person.

In a case of a contract in which the selection and the preparation support of members necessary for restoring the operation, the service mode is that the information output from the facility restoring task 31 in FIG. 3 is sent to the operation managing person.

In a case of a contract in which planning of the permanent corrective action is included, the service mode is that the information output from the permanent corrective action task 33 in FIG. 3 is sent to the operation managing person.

Such service modes corresponding to the abnormality corrective action data may be formed in a database and stored in a memory medium.

As described above, the present embodiment can be detect a sign of abnormality in an early stage by the means for transmitting the information on the operating state, the time-varying characteristics of the electric power generating facility and the means for processing and diagnosing the information obtained by the means for transmitting the information.

When an abnormality occurs, detailed study of the detected phenomenon can be performed in a short time by the means for weighing the degree of the abnormality stepwise and the means for transmitting the abnormality corrective action information and the means information to the section in charge of operation and the section in charge of operation support.

An optimized operation of the facility under operation can be supported by the means for offering the candidate trouble cause and the consequence effect information when the trouble is left as it is.

An external interruption to operation of the present system can be prevented by the means for protecting against intrusion and interruption to the communication line and the means for enciphering the signals.

According to the present invention, it is possible to provide an electric power facility operation remote supporting method and an electric power facility operation remote supporting system which can offer optimized operating support in a short time when an abnormality or a sign of abnormality occurs in the electric power generating facility.

What is claimed is:

1. An electric power facility operation remote supporting system for remotely supporting operation of an electric power generating facility by monitoring and diagnosing operating states of electric power generating facilities installed at a plurality of distributed places from a place different from the places of said facilities, which comprises:
   means for transmitting at least one of information on operating states and time-varying characteristics of components from said electric power generating facilities to said system;
   means for processing and diagnosing the information obtained by said means for transmitting information; and
   means for performing a load changing operation analysis by an operating characteristic evaluation tool which is a combination of a simulator and a control logic which are tuned so as to simulate characteristics of said concerned electric power generating facility when it is judged that a sign of abnormality occurs in the facility based on the information from said means for transmitting information, and transmitting recommended control set values obtained thereby to a section in charge of operation of said electric power generating facility when an analysis result obtained by said load changing operation analyzing function falls within an allowable range.

2. An electric power facility operation remote supporting system according to claim 1, which further comprises means for transmitting information on a place to perform repair of a component and a procedure of the repair of the component and an estimated cause of an abnormality to the section in charge of operation of said electric power generating facility when the abnormality occurs in the facility and when the repair of the component is required.

3. An electric power facility operation remote supporting system according to claim 1, which further comprises means for transmitting information on operating experience and component life-time compensating statuses of a concerned facility to the section in charge of operation of said electric power generating facility when said electric power generating facility is in a normal state, said information on operating experience and component life-time compensating statuses being obtained based on operating information transmitted plural times per day from said concerned facility.

4. An electric power facility operation remote supporting system according to claim 1, wherein said system further comprises:
   means for selecting tuning items and automatically tuning when said analysis result obtained by said load changing operation analysis falls out of said allowable range; and
   means for repeatedly tuning until the analysis result obtained by said load changing operation analysis falls within said allowable range.

5. An electric power facility operation remote supporting method for remotely supporting operation of an electric power generating facility by monitoring and diagnosing operating states of electric power generating facilities installed at a plurality of distributed places from a place different from the places of said facilities, wherein
   information including operating states and time-varying characteristics of components of a concerned electric power generating facility is transmitted to a monitoring person side under a condition pre-contracted with a manager of said concerned electric power generating facility, and
   an accounting contract corresponding to a degree of technical difficulty in regard to the abnormality corrective action corresponding to contents of the contract with the manager of said concerned electric power generating facility is made with the manager of said concerned electric power generating facility when a dynamic trend of said concerned electric power generating facility is calculated on the basis of the transmitted information and it is judged that a sign of abnormality or an abnormality occurs in the facility, a load changing operation analysis by an operating characteristic evaluation tool which is a combination of a simulator and a control logic which are tuned so as to simulate characteristics of said concerned electric power generating facility is performed, and recommended control set values obtained thereby are offered to a section in charge of operation of said concerned electric power generating facility when an analysis result obtained by said load changing operation analyzing function falls within an allowable range.

6. An electric power facility operation remote supporting method according to claim 5, wherein when said analysis result obtained by said load changing operation analysis falls out of said allowable range, tuning is repeated by selecting tuning items and effecting automatic tuning until the analysis result obtained by said load changing operation analysis falls within said allowable range.

7. An electric power facility operation remote supporting method for remotely supporting operation of an electric power generating facility, the method comprising the steps of:
presetting abnormality corrective-action data corresponding to a plural kinds of abnormality or abnormal sign data in regard to said electric power generating facility;
presetting servicing modes corresponding to said abnormality corrective-action data;
judging an abnormality or a sign of abnormality of said electric power generating facility based on at least one of operating state information of said electric power generating facility and information on time-varying characteristics of electric power facility components; and
setting a servicing mode based on information judging an abnormality or a sign of abnormality and said preset abnormality corrective-action data corresponding to abnormality or abnormal sign data and said preset servicing modes corresponding to said abnormality corrective-action data when said abnormality or said sign of abnormality occurs in said electric power generating facility.

8. An electric power facility operation remote supporting system for remotely supporting operation of an electric power generating facility by monitoring and diagnosing operating states of electric power generating facilities installed at a plurality of distributed places from a place different from the places of said facilities, which comprises:
means for transmitting at least one of information on operating states and time-varying characteristics of components from said electric power generating facilities to said system;
means for processing and diagnosing the information obtained by said means for transmitting information; and
means for starting a prepared abnormality corrective-action task corresponding to a degree of abnormality when it is judged that a sign of abnormality occurs in the facility based on the information from said means for transmitting information, and transmitting information generated thereby to a section in charge of operation of said electric power generating facility,
wherein when a sign of abnormality occurs in said electric power generating facility and can be solved by changing a set value in a control unit associating with said facility, the information on an operating state and the time-varying characteristics of the components from said electric power generating facility is input to a simulator which reproduce characteristics of the actual facility using information on test operation of said concerned facility performed in advance and normal operating information, and a control condition is improved based on a set value changing guideline obtained from a sensitivity analysis in advance, and then the improved information is offered to the manager of said facility.

9. An electric power facility operation remote supporting system for remotely supporting operation of an electric power generating facility, which comprises:
a database for storing abnormality corrective-action data corresponding to data of a plurality of abnormalities or signs of abnormality in regard to said electric power generating facility;
a database for storing service modes corresponding to said abnormality corrective-action data;
means for judging an abnormality or a sign of abnormality of said electric power generating facility based on at least one of information on an operating state of said electric power generating facility and information on time-varying characteristic of components of said electric power generating facility; and
means for setting a service mode based on information judging an abnormality or a sign of abnormality when the abnormality or the sign of abnormality occurs in said electric power generating facilities, said stored abnormality corrective-action data corresponding to data of the abnormalities or the signs of abnormality, and said stored service modes corresponding to said abnormality corrective-action data.

* * * * *